United States Patent
Reuche (10) Patent No.: US 9,497,766 B2
(45) Date of Patent: Nov. 15, 2016

(54) DEVICE AND METHOD FOR CONFIGURING A COMMUNICATION DEVICE

(71) Applicant: SAGEMCOM BROADBAND SAS, Rueil Malmaison (FR)

(72) Inventor: Anthony Reuche, Rueil-Malmaison (FR)

(73) Assignee: SAGECOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/648,302

(22) PCT Filed: Nov. 25, 2013

(86) PCT No.: PCT/EP2013/074601
§ 371 (c)(1),
(2) Date: May 29, 2015

(87) PCT Pub. No.: WO2014/082956
PCT Pub. Date: Jun. 5, 2014

(65) Prior Publication Data
US 2015/0305048 A1 Oct. 22, 2015

(30) Foreign Application Priority Data
Nov. 30, 2012 (FR) ..................... 12 61463

(51) Int. Cl.
*H04W 72/00* (2009.01)
*H04W 72/08* (2009.01)
(Continued)

(52) U.S. Cl.
CPC ........... *H04W 72/082* (2013.01); *H04W 72/02* (2013.01); *H04W 76/02* (2013.01); *H04W 84/12* (2013.01)

(58) Field of Classification Search
CPC . H04W 72/082; H04W 76/02; H04W 72/02; H04W 84/12
See application file for complete search history.

(56) References Cited

U.S. PATENT DOCUMENTS 6,272,348 B1 * 8/2001 Saario ............... H04J 13/16
455/448
7,469,013 B1 * 12/2008 Bolt ............... H04L 1/0003
375/260

(Continued)

FOREIGN PATENT DOCUMENTS

| EP | 2 207 395 A2 | 7/2010 |
| EP | 2 367 397 A1 | 9/2011 |
| WO | 03/081925 A1 | 10/2003 |

OTHER PUBLICATIONS

Jan. 16, 2014 Search Report issued in International Application No. PCT/EP2013/074601.

*Primary Examiner* — Erin File
(74) *Attorney, Agent, or Firm* — Oliff PLC; R. Brian Drozd (57) ABSTRACT

In order to configure a communication device connected to a wireless network including N communication channels, the communication device being adapted for communicating via one communication channel at a time, means of selection of a channel from amongst the N communication channels enables: selecting a communication channel with an unknown disturbance level, when the disturbance level of at least one communication channel is unknown; and otherwise selecting the least disturbed communication channel. Dynamic configuration means include means for reactivating the selection means in case of disturbances representing unsatisfactory transmission conditions on the selected communication channel according to a predetermined criterion. The dynamic configuration means are deactivated when the selection means have been reactivated N times.

13 Claims, 5 Drawing Sheets

(51) Int. Cl.
*H04W 72/02* (2009.01)
*H04W 76/02* (2009.01)
*H04W 84/12* (2009.01)

(56) References Cited

U.S. PATENT DOCUMENTS

| | | | |
|---|---|---|---|
| 2001/0055297 A1* | 12/2001 | Benveniste | H04W 16/14 370/349 |
| 2005/0095986 A1* | 5/2005 | Hassan | H04W 16/14 455/67.13 |
| 2005/0122999 A1* | 6/2005 | Scherzer | H04L 1/02 370/480 |
| 2008/0112340 A1 | 5/2008 | Luebke | |
| 2010/0177710 A1* | 7/2010 | Gutkin | H04W 72/082 370/329 |
| 2012/0058728 A1 | 3/2012 | Wang et al. | |
| 2012/0252510 A1 | 10/2012 | Wang et al. | |
| 2015/0326463 A1* | 11/2015 | Solondz | H04L 43/12 370/252 |

* cited by examiner

DEVICE AND METHOD FOR CONFIGURING A COMMUNICATION DEVICE

The present invention relates to configuring a communication device intended to be connected to a wireless network comprising a number N of communication channels, with N≥2, the communication device being adapted to communicate via one communication channel at a time.

Radio communication devices are, with regard to the growth in the number of this type of product and the variety of communication standards that they implement, more and more subjected to radio disturbances in their own frequency range of use. The communication networks interconnecting these communication devices generally comprise a plurality of communication channels enabling in particular to overcome this problem. Indeed, disturbances occurring on one communication channel do not necessarily occur on another communication channel. One then talk about frequency selectivity, meaning that disturbances will have a greater or lesser impact on the communication possibilities according to the frequency band or sub-band used.

Many communication technologies are based on a use of one communication channel at a time. The DECT (Digital Enhanced Cordless Telephone), ZigBee (registered trademark) based on IEEE 802.15.4, and Wi-Fi (registered trademark) based on IEEE 802.11 technologies can for example be cited.

In order to be able to select a communication channel, Automatic Channel Selection mechanisms are used. One limitation afforded by the known automatic channel selection mechanisms is that they are based on an analysis of disturbances that is made solely before the selection of the communication channel, whereas new disturbances may arise over time, for example following an activation of a microwave oven, the installation of a radio-frequency system of a competing technology near by, etc. Thus the communication channel initially chosen may prove to provide unsatisfactory transmission conditions over time.

It is desirable to overcome these drawbacks of the prior art. It is in particular desirable to provide a solution that enables dynamically changing a communication channel while avoiding unwanted switchings. Indeed, each channel switching causes a reconfiguration of the communication devices, which may impair the overall communication performances.

The invention concerns a configuration device adapted to configure a communication device intended to be connected to a wireless network comprising a number N of communication channels, with N≥2, the communication device being adapted to communicate via one communication channel at a time, the configuration device comprising means of selection of one channel among the N communication channels. The selection means are adapted for: selecting a communication channel with an unknown disturbance level, when the disturbance level of at least one communication channel is unknown to the configuration device; and otherwise selecting the least disturbed communication channel. The configuration device comprises means of dynamic configuration of the communication device comprising means for reactivating the selection means, in case of disturbances representing unsatisfactory transmission conditions on the selected communication channel according to a predetermined criterion. The configuration device further comprises means for deactivating the dynamic configuration means, when the selection means have been reactivated N times. Thus the configuration of the communication device is adapted to new disturbances that appear over time, while avoiding unwanted switchings of communication channels. Indeed, once the N communication channel selection reactivations have been performed, all the communication channels have been scanned.

According to a particular embodiment, said deactivation means are adapted to deactivate the dynamic configuration means until an estimated period of stability of the transmission conditions on the communication channels has expired. Thus processing resources of the configuration device are preserved. Thus the communication device adapts all the better to new disturbances that appear over time.

According to a particular embodiment, the dynamic configuration means comprise means of analysis of disturbances occurring on the selected communication channel adapted for determining the type of said disturbances, and said predetermined criterion depends on the type of said disturbances. Thus a change of communication channel is operated in a suitable manner according to the type of disturbance.

According to a particular embodiment, the analysis means are adapted for determining at least one type of disturbance from amongst: a blocking noise, which has a level higher than a first threshold; a persistent noise, which is present at least for a predefined duration; a highly persistent noise, which is present at least for a second predefined duration longer than the first predefined duration; a repetitive noise, which is a blocking noise appearing a plurality of times during a predefined period.

According to a particular embodiment, the analysis means comprise: means for dividing an analysis total period into a plurality of unitary periods; means for activating a first counter, incremented whenever the disturbance level exceeds a second threshold during a unitary period. The analysis means are adapted for considering the disturbances to be a persistent noise when the first counter is above a third threshold, once the analysis total period has elapsed. Thus a persistent noise is detected in a simple manner.

According to one embodiment, the analysis means are adapted for considering the disturbances to be a highly persistent noise when the first counter is above a fourth threshold, once the analysis total period has elapsed, said fourth threshold being higher than said third threshold. Thus a highly persistent noise is detected in a simple manner.

According to a particular embodiment, the analysis means comprise: means for dividing an analysis total period into a plurality of analysis sub-periods; means for activating a second counter, incremented whenever a predefined type of disturbance is detected during one said analysis sub-period. The analysis means are adapted for considering the disturbances to be a repetitive noise when the second counter is above a fifth threshold, once the analysis total period has elapsed. Thus a repetitive noise is detected in a simple manner.

According to a particular embodiment, the predetermined criterion also depends on a type of application communicating via the wireless network. Thus a change in communication channel is operated in a suitable manner according to the applications communicating via the wireless network.

According to a particular embodiment, the configuration device comprises means of protocol analysis of frames passing through the communication device and means for determining the type of application according to a result of the protocol analysis. Thus communication devices available off-the-shelf are supported.

According to a particular embodiment, the configuration device is adapted for suspending the dynamic configuration means, after each reactivation of the selection means, until the expiry of an estimated stabilisation period for reconfiguring communication devices in the wireless network following a change of communication channel. Thus a change of communication channel is performed only when the configuration of the communication devices in the wireless network is stabilised.

According to a particular embodiment, the configuration device is included in the communication device.

According to a particular embodiment, the communication device is a Wi-Fi (registered trademark) access point. Thus, when the configuration device makes any change of communication channel, it takes account of all the data paths, which would not be the case with another communication device in the Wi-Fi (registered trademark) communication network.

The invention also concerns a method implemented by a device for configuring a communication device connected to a wireless network comprising a number N of communication channels, with N≥2, the communication device being adapted for communicating via one communication channel at a time, the configuration device comprising means of selection of one channel among the N communication channels. The selection means are adapted for: selecting a communication channel with an unknown disturbance level, when the disturbance level of at least one communication channel is unknown to the configuration device; and otherwise selecting the least disturbed communication channel. The configuration device comprises means of dynamic configuration of the communication device comprising means for reactivating the selection means, in case of disturbances representing unsatisfactory transmission conditions on the selected communication channel according to a predetermined criterion. The method is such that it comprises a step of deactivating the dynamic configuration means, when the selection means have been reactivated N times.

The features of the invention mentioned above, as well as others, will emerge more clearly from a reading of the following description of an example embodiment, said description being given in relation to the accompanying drawings, among which.

Figure 1:
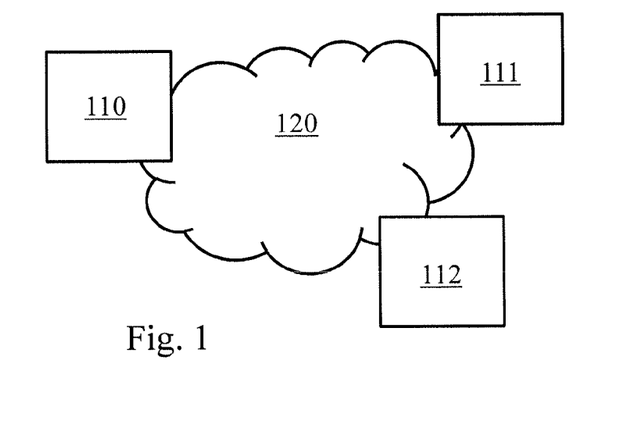
FIG. 1 schematically illustrates a wireless communication system in which the present invention may be implemented.

FIG. 1 schematically illustrates a communication system in which the present invention may be implemented. The communication system comprises at least two communication devices 110, 111, 112 interconnected by a wireless network 120.

In a particular embodiment, the wireless network 120 is a WLAN (Wireless Local Area Network), for example of the DECT type, or of the ZigBee (registered trademark) type. Preferably, the wireless network 120 is of the Wi-Fi (registered trademark) type.

The wireless network 120 comprises a number N of communication channels, with N≥2. The communication devices 110, 111, 112 can communicate via only one communication channel at a time. Thus, when the communication devices 110, 111, 112 are configured to communicate via one communication channel among said N channels, the communication devices 110, 111, 112 do not have knowledge of disturbances occurring on any other communication channel among said N channels.

When two communication devices 110, 111 communicate with each other, one of them is responsible for selecting a communication channel from amongst said N channels. In a preferred embodiment, in which an access point or a base station is defined for managing the wireless network 120, the access point or the base station is responsible for selecting the same communication channel for the entire wireless network 120.

Let us consider hereinafter that the communication device 110 is responsible for selecting the communication channel to be used within the entire wireless network 120. Thus the communication device 110 is preferably a Wi-Fi (registered trade mark) access point.

Figure 2A:
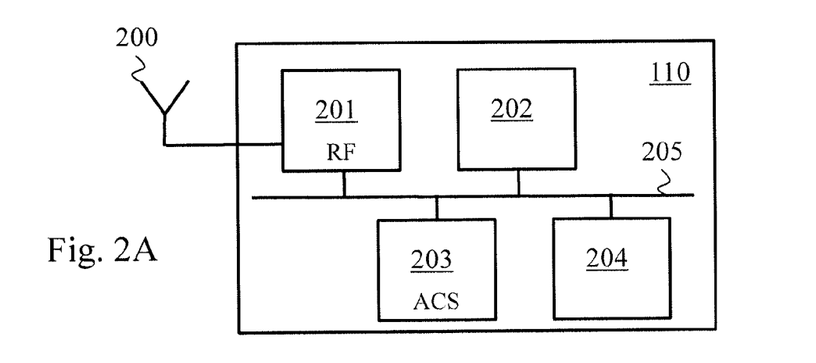
FIG. 2A schematically illustrates a first example of hardware architecture of a communication device of the wireless communication system.

FIG. 2A schematically illustrates a first example of hardware architecture of the communication device 110. The communication device 110 then comprises an antenna 200 and, connected by a communication bus 205: a radio-frequency communication module RF 201 connected to the antenna 200, a base-band data processing module 202, an automatic channel selection module ACS 203 and a configuration module 204 adapted for configuring the communication device 110.

The automatic channel selection module ACS 203 is adapted for receiving the signals coming from the radio-frequency communication module RF 201 in order to distinguish the signals complying with the current communication standard in the wireless network 120, e.g. Wi-Fi (registered trademark), from the other signals in the same frequency band, i.e. the signals creating disturbances. On this basis, the automatic channel selection module ACS 203 is adapted for selecting the communication channel that is the least disturbed among the N communication channels, unless the disturbance level of at least one communication channel is not known to the automatic channel selection module ACS 203. In this case, the automatic channel selection module ACS 203 selects a communication channel the disturbance level of which is not known. When several communication channels have an unknown disturbance level, the automatic channel selection module ACS 203 may make an arbitrary selection among these communication channels, or according to a predefined sequence, or according to a number of access points detected for each of these communication channels.

The configuration module 204 is responsible for detecting when the communication conditions are met for requesting a reactivation of the automatic channel selection module ACS 203. The operation of the configuration module 204 is detailed below in relation to FIGS. 3, 4, 5, 6A and 6B. The configuration module 204 may determine the level of disturbances on each communication channel from signals received from the radio-frequency communication module RF 201, or can receive information representing said level of the disturbances coming from the automatic channel selection module ACS 203.

In a first embodiment, the automatic channel selection module ACS 203 receives information from the configuration module 204 indicating, for each communication channel among the N communication channels, whether the disturbance level is known, and information representing this disturbance level when it is known. For example, the automatic channel selection module ACS 203 receives from the configuration module 204 a default value if the disturbance level is unknown, and otherwise a counter value C1, as described below in relation to FIG. 4. Any other value representing the disturbance level may be used. The automatic channel selection module ACS 203 then makes the communication channel selection according to the information supplied by the configuration module 204.

In a second embodiment, the automatic channel selection module ACS 203 analyses the signals received via the module RF 201. The automatic channel selection module ACS 203 obtains information from this analysis indicating, for each communication channel among the N communication channels, whether the disturbance level is known, and information representing this disturbance level when it is known. The automatic channel selection module ACS 203 then comprises an input enabling the configuration module 204 to reinitialise this information during a dynamic configuration deactivation, as described below in relation to FIG. 3.

Figure 2B:
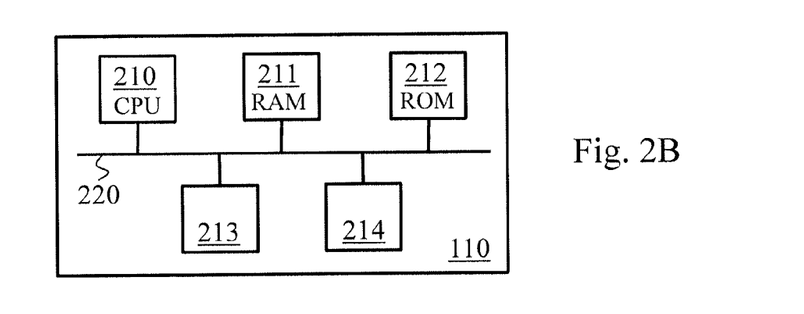
FIG. 2B schematically illustrates a second example of hardware architecture of a communication device of the wireless communication system.

FIG. 2B schematically illustrates a second example of hardware architecture of the communication device 110. The communication device 110 then comprises, connected by a communication bus 220: a processor or CPU (Central Processing Unit) 210; a Random Access Memory RAM 211; a Read Only Memory ROM 212; a storage unit or a storage medium reader, such as an SD (Secure Digital) card reader 213; and an interface 214 for communicating via the wireless network 120.

The processor 210 is capable of executing instructions loaded into the RAM 211 from the ROM 212, from an external memory (not shown), from a storage medium, or from a communications network. When the communication device 110 is powered up, the processor 210 is capable of reading instructions from the RAM 211 and executing them. These instructions form a computer program causing the implementation, by the processor 210, of all or some of the algorithms and steps described below.

Thus all or some of the algorithms and steps described below can be implemented in software form through the execution of a set of instructions by a programmable machine, such as a DSP (Digital Signal Processor) or a microcontroller.

All or some of the algorithms and steps described below can be implemented in hardware form by a machine or a dedicated component, such as an FPGA (Field-Programmable Gate Array) or an ASIC (Application-Specific Integrated Circuit). Such a hardware implementation corresponds for example to the architecture already presented in relation to FIG. 2A.

Figure 3:
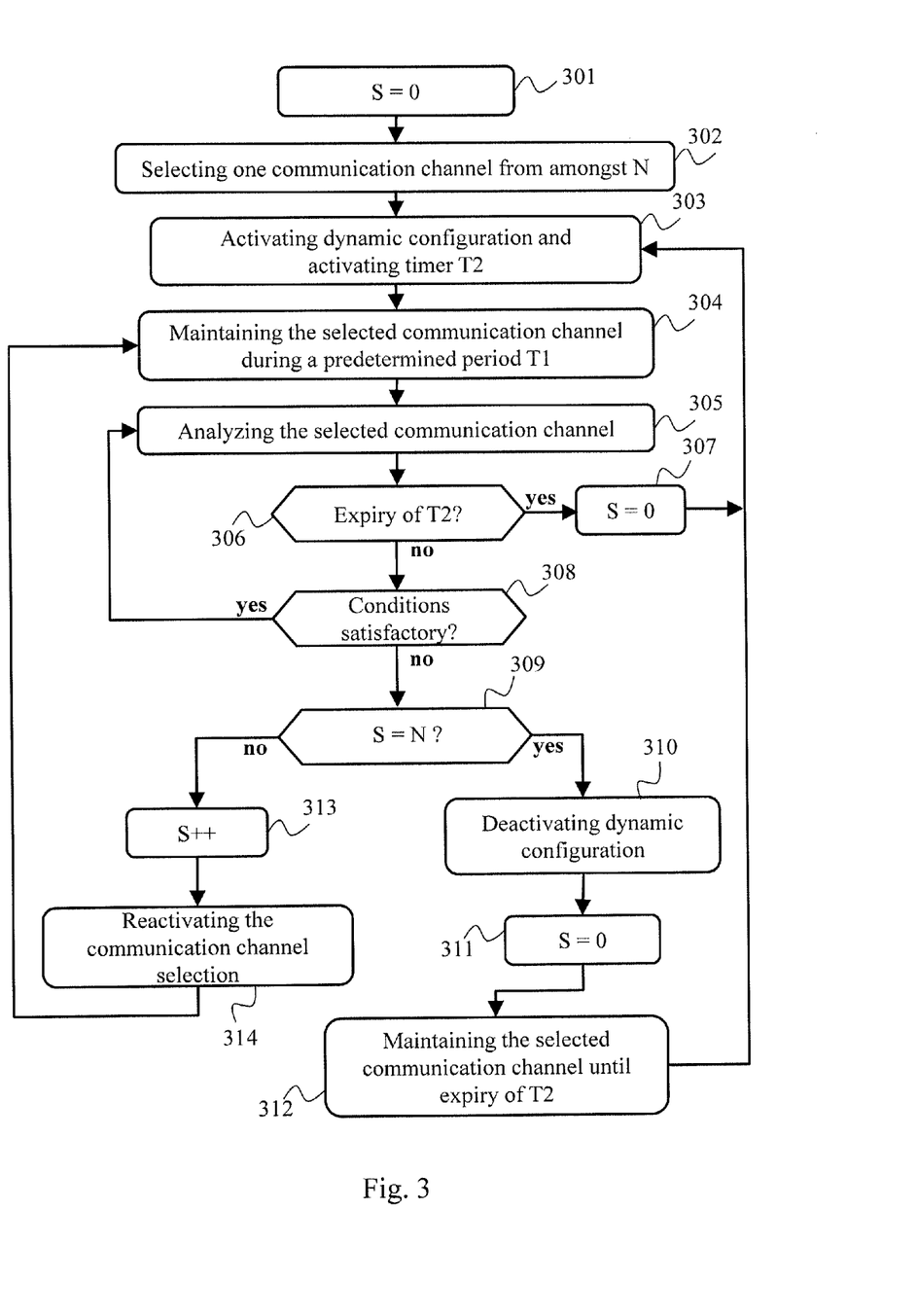
FIG. 3 schematically illustrates an algorithm for configuring the communication device with regard to the selection of a communication channel.

FIG. 3 schematically illustrates a configuration algorithm for the communication device 110 with regard to the selection of a communication channel. The algorithm is preferably executed by the communication device 110, although it may be executed by another device connected to the communication device 110. Let us consider that the algorithm is implemented by the communication device 110.

In a step 301, the communication device 110 sets a parameter S to 0. The parameter S represents a number of times that the selection of a communication channel from amongst the N communication channels in the wireless network 120 is reactivated.

In a following step 302, the communication device 110 selects a communication channel from amongst the N communication channels in the wireless network 120. Considering the architecture presented in FIG. 2A, the configuration module 204 requests the automatic channel selection module ACS 203 to select a communication channel. At this stage, no information is available for selecting the least disturbed communication channel. The selection therefore takes place in an arbitrary manner, or according to a predefined sequence, or according to a number of access points detected for each of these communication channels.

In a following step 303, the communication device 110 activates a dynamic configuration process with regard to the selection of a suitable communication channel. The communication device 110 also activates a timer T2, the duration of which represents an estimated duration of stability of the transmission conditions on the N transmission channels.

In a following optional step 304, the communication device 110 maintains the selected communication channel for a period of duration T1, for example equal to 1 minute. In other words, the communication device 110 suspends the dynamic configuration process until the period T1 expires. T1 is an estimated duration of stabilisation of reconfiguration of the communication devices 110, 111, 112 in the wireless network 120 following a change of communication channel.

In a step 305, the communication device 110 analyses the disturbances on the selected communication channel. Embodiments of this analysis are presented below in relation to FIGS. 4 and 5. The analysis step 305 can be performed during said period of duration T1, or after expiry of said period of duration T1, or independently of said period of duration T1.

In a following step 306, the communication device 110 determines whether the timer T2 activated at the step 303 has elapsed. If such is the case, a step 307 is performed; otherwise a step 308 is performed.

In the step 307, the communication device 110 resets the parameter S to 0. Next, the step 303 is reiterated, wherein the timer T2 is reinitialised and reactivated.

In the step 308, the communication device 110 determines, according to the analysis of the disturbances on the selected communication channel, whether the transmission conditions on the communication channel are satisfactory according to a predetermined criterion.

Preferably, the communication device 110 determines during the analysis at least one type of disturbance occurring on the analysis communication channel, and said predetermined criterion depends on the type of disturbance observed.

According to a particular embodiment, the predetermined criterion relates to the crossing of a first threshold S1 by the disturbance level during the analysis. This corresponds to a noise, referred to as a blocking noise, momentarily blocking the transmissions on the transmission channel in question. The transmission conditions are then considered to be satisfactory if the first threshold S1 is never crossed by the disturbance level during the analysis.

According to another particular embodiment, the predetermined criterion relates to the crossing during the analysis of a second threshold by the disturbance level, and this for a cumulated period greater than a third threshold S3. This corresponds to a persistent noise, impairing the bandwidth of the selected communication channel over a given period. It should be noted that the first threshold S1 is greater, or even appreciably greater, than the second threshold S2. The predetermined criterion may also relate to the crossing of the second threshold S2 by the disturbance level during the analysis, for a cumulated period greater than a fourth threshold S4. This corresponds to a highly persistent noise, impairing the bandwidth of the communication channel selected over a given period. It should be noted that the fourth threshold S4 is greater, or even appreciably greater, than the third threshold S3. The difference between a disturbing noise and a highly disturbing noise lies in the fact that a highly disturbing noise reduces the bandwidth available below a critical level for the transmission of data. For example, a persistent noise may simply require an adaptation of bitrate in the context of an adaptive stream transmission, whereas a highly persistent noise may, as far as possible, require a change of communication channel.

According to another particular embodiment, the predetermined criterion relates to a repetitive noise, meaning a plurality of occurrences of a given noise, whether it be blocking, persistent or highly persistent.

According to yet another particular embodiment, the predetermined criterion relates to the crossing of a maximum threshold Smax by the disturbance level during the analysis. This corresponds to a noise that momentarily blocks the transmissions on the N transmission channels. The transmission conditions are then considered to be satisfactory if the threshold Smax is crossed by the disturbance level during the analysis, since the disturbances have had a similar impact over all the N communication channels.

The communication device 110 is then adapted for detecting at least one among these types of disturbance during the analysis made at the step 305. The predetermined criterion can then define that certain types of disturbance may then be acceptable, others not. For example, a detection of disturbances of the repetitive noise or persistent noise or highly persistent noise type may have to imply a reactivation of the automatic channel selection module ACS 203, unlike a detection of disturbances of the blocking noise type.

According to yet another particular embodiment, the predetermined criterion also depends on at least one application communicating via the wireless network 120. Certain types of disturbance may then be acceptable, others not, depending on the application or applications communicating via the wireless network 120. For example, for an application broadcasting audio content in streaming mode, a persistent noise may be acceptable but not a repetitive noise or a highly persistent noise, whereas in case of an application broadcasting video content in streaming mode, a persistent or highly persistent noise may not be acceptable. This aspect is detailed below in relation to FIGS. 6A and 6B.

If the transmission conditions are satisfactory, the step 305 is reiterated; otherwise a step 309 is performed.

In the step 309, the communication device 110 determines whether the parameter S is equal to the number N of communication channels. If such is the case, a step 310 is performed; otherwise a step 313 is performed.

In the step 313, the communication device 110 increments the parameter S by one unit.

In a following step 314, the communication device 110 reactivates the selection of a communication channel from amongst the N communication channels in the wireless network 120. Considering the architecture presented in FIG. 2A, the configuration module 204 reactivates the automatic channel selection module ACS 203. As long as the disturbance level of at least one communication channel is not known to the communication device 110, a communication channel the disturbance level of which is not known is selected; in this case, S<N. Otherwise the least disturbed communication channel is selected; in this case, S=N. Then, the step 304 is reiterated with the communication channel selected at the step 314. In a variant embodiment, in the case where S=N at the end of the step 314, the step 310 may be performed.

In the step 310, the communication device 110 deactivates the dynamic configuration process. Each parameter serving to store the disturbance level of the N communication channels is then reinitialised.

In a following step 311, the communication device 110 resets the parameter S to 0. Any information relating to disturbance levels observed during the analysis step 305 is also reinitialised.

In a following step 312, the communication device 110 maintains the selected communication channel until the expiry of the timer T2. Since the duration of the timer T2 represents the estimated time of stability of the transmission conditions, and given that all the N communication channels have been observed and the least disturbed has been selected, it is advantageous, in terms of resource consumption and efficiency of the wireless communication system, to reactivate the dynamic configuration process only on expiry of the timer T2. This ensures convergence of the selection of a transmission channel, by preventing continual switching from one channel to another in case of widespread disturbances over all the N communication channels. Then, the step 303 is reiterated.

In a variant embodiment, when the transmission conditions are judged satisfactory at the step 308, the step 310 is performed. It is then considered that the channel is stable until the timer T2 expires and that the transmission conditions remain satisfactory until the timer T2 expires.

Figure 4:
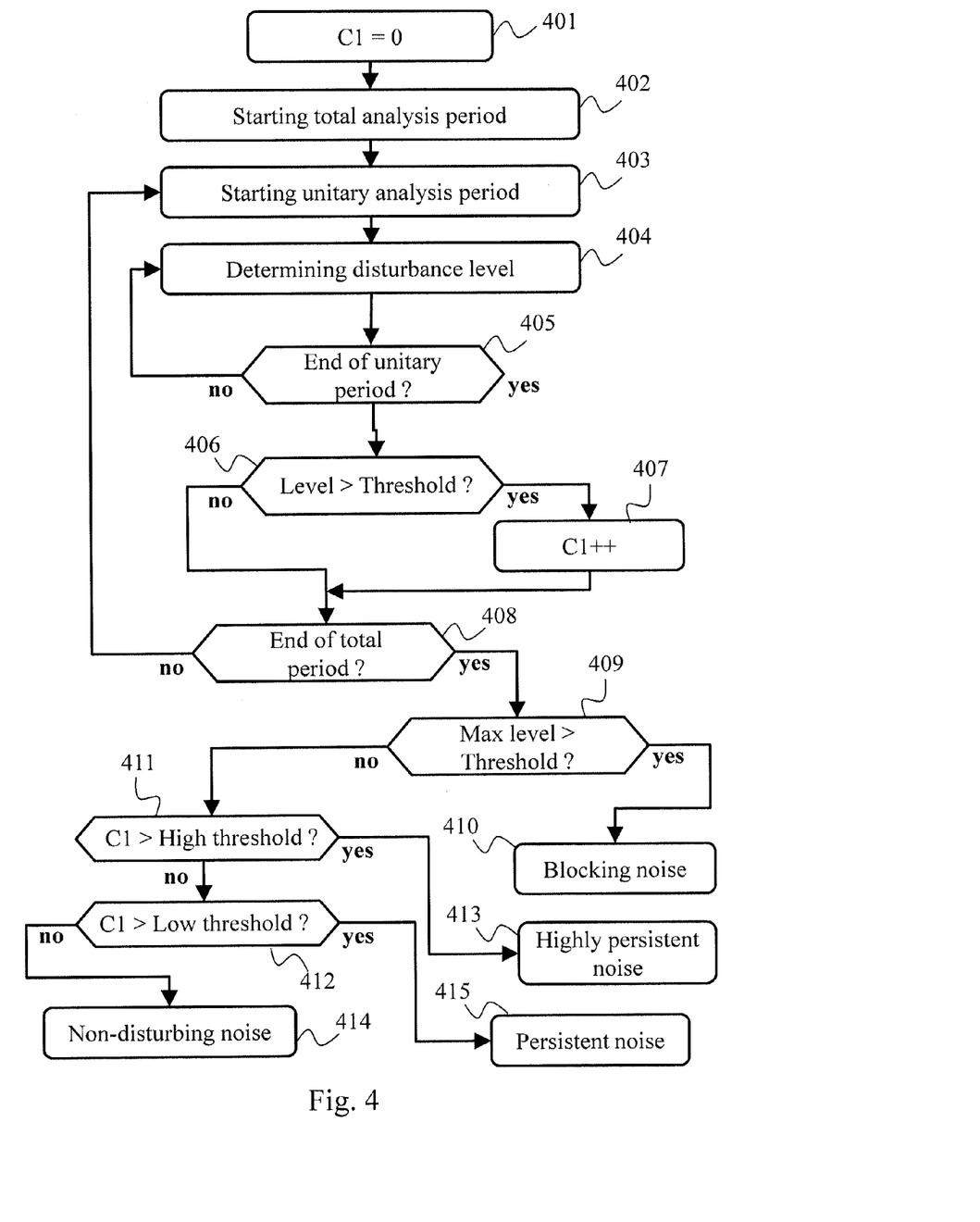
FIG. 4 schematically illustrates a first algorithm for detecting the type of disturbance occurring on the selected communication channel.

FIG. 4 schematically illustrates a first algorithm of detection of the type of disturbances occurring on the selected communication channel, when the step 305 is executed. The algorithm is preferably executed by the communication device 110, although it can be executed by another device connected to the communication device 110. Let us consider that the algorithm is implemented by the communication device 110.

In a step 401, the communication device 110 sets a counter C1 to 0. In a following step 402, the communication device 110 starts an analysis total period. In a following step 403, the communication device 110 starts an analysis unitary period, the duration of said total period being a predefined multiple of the duration of said unitary period.

In a following step 404, the communication device 110 observes the disturbance level on the selected channel.

In a following step 405, the communication device 110 determines whether the unitary period started at the step 403 has elapsed; if such is the case, a step 406 is performed; otherwise the step 404 is reiterated.

In step 406, the communication device 110 determines whether the disturbance level observed is higher than the second threshold S2 already mentioned. If such is the case, a step 407 is performed; otherwise a step 408 is performed.

In the step 407, the communication device 110 increments the counter C1 by one unit, and then the step 408 is performed. The counter C1 therefore indicates a number of unitary periods during which a disturbance level higher than the threshold S2 is detected. In light of the number of unitary periods in the analysis total period, the counter C1 then represents a temporal level of disturbances, beyond the threshold S2, during the analysis total period.

In the step 408, the communication device 110 determines whether the analysis total period started at the step 402 has elapsed. If such is the case, a step 409 is performed; otherwise a new analysis unitary period is started by reiteration of the step 403.

In the step 409, the communication device 110 determines whether, during the elapsed analysis total period, the maximum level of disturbances observed is higher than the first threshold S1 already mentioned. If such is the case, a step 410 is performed; otherwise a step 411 is performed.

In the step 410, the communication device 110 considers that the disturbance level observed during the elapsed analysis total period represents a blocking noise.

In the step 411, the communication device 110 determines whether the counter C1 is higher than the fourth threshold S4 already mentioned. If such is the case, a step 413 is performed; otherwise a step 412 is performed.

In the step 412, the communication device 110 determines whether the counter C1 is higher than the third threshold S3 already mentioned. If such is the case, a step 415 is performed; otherwise a step 414 is performed. The threshold S4 being higher than the threshold S3, they are respectively denoted high threshold and low threshold in FIG. 4.

In the step 413, the communication device 110 considers that the disturbance level observed during the elapsed analysis total period represents a highly persistent noise.

In step 414, the communication device 110 considers that the disturbance level observed during the elapsed analysis total period does not represent a disturbing noise.

In step 415, the communication device 110 considers that the disturbance level observed during the elapsed analysis total period represents a persistent noise.

In other words, in order to detect the presence of a persistent noise or of a highly persistent noise, the communication device 110 divides the analysis total period into a plurality of analysis unitary periods and then observes the disturbance level occurring on the selected communication channel. The communication device 110 activates the counter C1, which is incremented whenever the disturbance level exceeds the threshold S2 for a unitary period, and considers the disturbances to be a persistent noise when the value of the counter C1 is higher than the threshold S3, once the analysis total period has elapsed, and to be a highly persistent noise when the value of the counter C1 is higher than the threshold S4 once the analysis total period has elapsed.

The algorithm in FIG. 4 enables the communication device 110 to detect the presence of persistent noise and/or highly persistent noise and/or blocking noise during the step 305. The communication device 110 can also distinguish the disturbances related to a repetitive noise from isolated disturbances; an example of implementation is detailed below in relation to FIG. 5. Thus the communication device 110 can determine whether the transmission conditions are satisfactory according to the type of disturbance detected.

Figure 5:
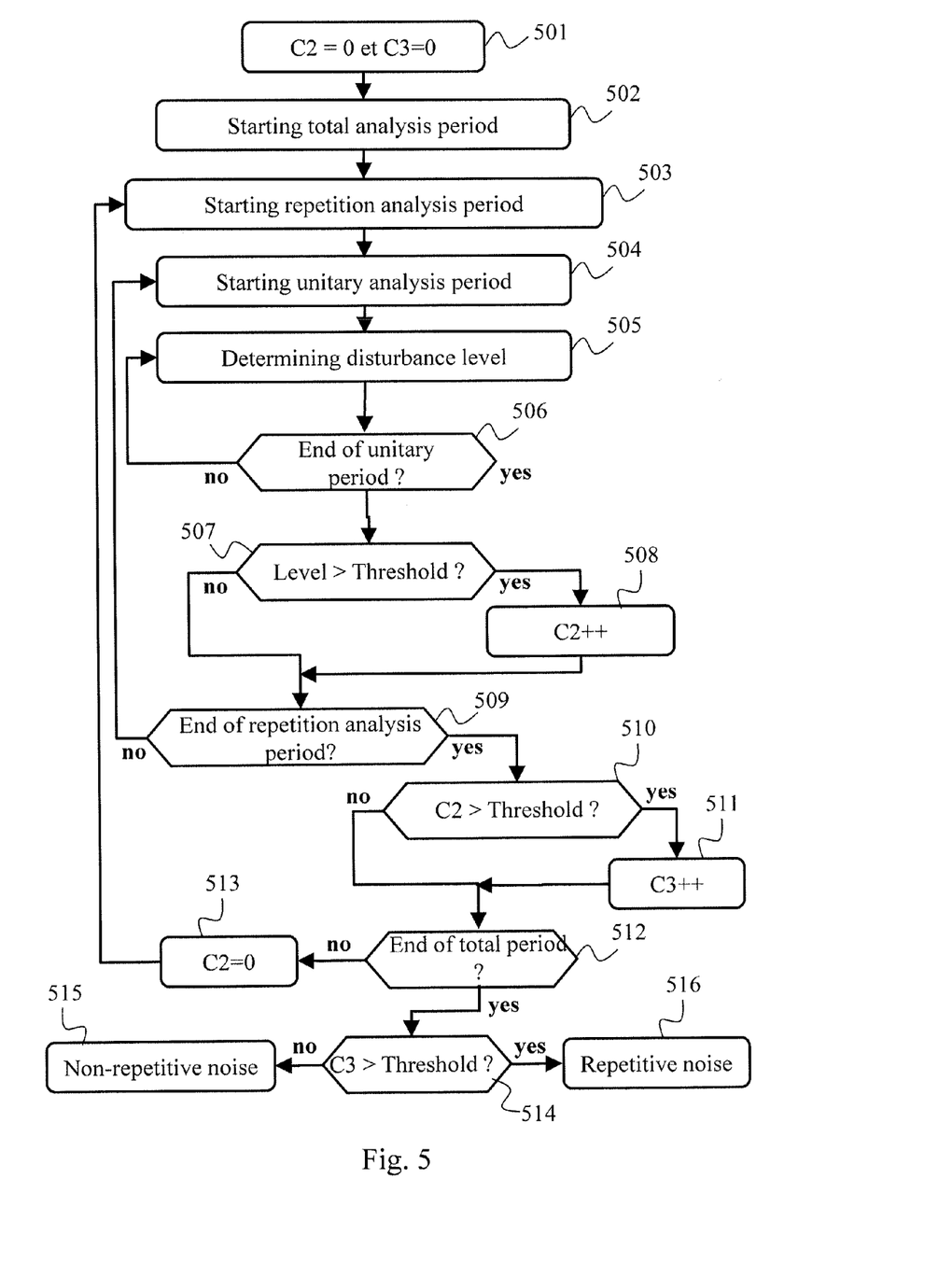
FIG. 5 schematically illustrates a second algorithm for detecting the type of disturbance occurring on the selected communication channel.

FIG. 5 schematically illustrates a second algorithm for detecting the type of disturbance occurring on the selected communication channel, aiming at determining the character, repetitive or not, of a noise. The algorithm is preferably executed by the communication device 110, although it can be executed by another device connected to the communication device 110. Let us consider that the algorithm is implemented by the communication device 110.

In a step 501, the communication device 110 sets a counter C2 to 0 and sets a counter C3 to 0. In a following step 502, the communication device 110 starts the analysis total period. In a following step 503, the communication device 110 starts a repetition analysis period. In a following step 503, the communication device 110 starts an analysis unitary period. The duration of said total period being a predefined multiple of the duration of said unitary period and a predefined multiple of the repetition analysis period. Each repetition analysis period can then be considered to be a sub-period of the analysis total period. The duration of each repetition analysis period is also a predefined multiple of said unitary period.

In a following step 505, the communication device 110 observes the disturbance level on the selected channel.

In a following step 506, the communication device 110 determines whether the unitary period started at the step 503 has elapsed; if such is the case, a step 507 is performed; otherwise the step 505 is reiterated.

In the step 507, the communication device 110 determines whether the disturbance level observed is higher than the second threshold S2 already mentioned. If such is the case, a step 508 is performed; otherwise a step 509 is performed.

In step the 508, the communication device 110 increments the counter C2 by one unit, and then the step 509 is performed. The counter C2 therefore indicates a number of unitary periods during which a disturbance level higher than the threshold S2 is detected during the current repetition analysis period.

In the step 509, the communication device 110 determines whether the repetition analysis period started at the step 503 has elapsed. If such is the case, a step 510 is performed; otherwise a new analysis unitary period is started by reiterating the step 504.

In the step 510, the communication device 110 determines whether the counter C2 is higher than the third threshold S3 in order to detect a repetitive persistent noise, or higher than the fourth threshold S4 in order to detect a repetitive highly persistent noise. If such is the case, a step 511 is performed; otherwise a step 512 is performed.

In the step 511, the communication device 110 increments the counter C3 by one unit, and then the step 512 is performed. The counter C3 then represents a number of repetition analysis periods during which a persistent noise is present, or a highly persistent noise, according to the case in question. Then the step 512 is performed.

In the step 512, the communication device 110 determines whether the analysis total period started at the step 502 has elapsed. If such is the case, a step 514 is performed; otherwise a step 513 is performed.

In the step 513, the communication device 110 reinitialises the counter to 0, so as to restart for a new repetition analysis period by reiterating the step 503.

In the step 514, the communication device 110 determines whether the counter C3 is higher than a fifth threshold S5. If such is the case, a step 515 is performed; otherwise a step 516 is performed.

In the step 515, the communication device 110 considers that the disturbance level observed during the elapsed analysis total period does not represent a repetitive noise.

In the step 516, the communication device 110 considers that the disturbance level observed during the elapsed analysis total period represents a repetitive persistent noise, or a repetitive highly persistent noise, according to the considered case.

In other words, in order to detect the presence of a repetitive noise, the communication device 110 divides the analysis total period into a plurality of analysis unitary periods and then observes the disturbance level occurring on the selected communication channel. The communication device 110 activates the counter C3, which is incremented whenever a type of persistent or highly persistent noise is detected during a repetition analysis period, and considers the disturbances to be a repetitive noise when the value of the counter C3 is higher than the threshold S5, once the analysis total period has elapsed.

The algorithm of FIG. 5 is therefore suited to the detection of a repetitive persistent or highly persistent noise. The same principle is applicable to the detection of a repetitive blocking noise by comparing at the step 507 the maximum disturbance level observed with the first threshold S1 already mentioned. If the maximum disturbance level observed is higher than the first threshold S1, an occurrence of blocking noise is detected and the counter C3 is incremented by one unit. The communication device 110 then passes from the step 507 directly to the step 511; otherwise the communication device 110 then passes from the step 507 directly to the step 512. In other words, the counter C2 is not used.

Figure 6A:
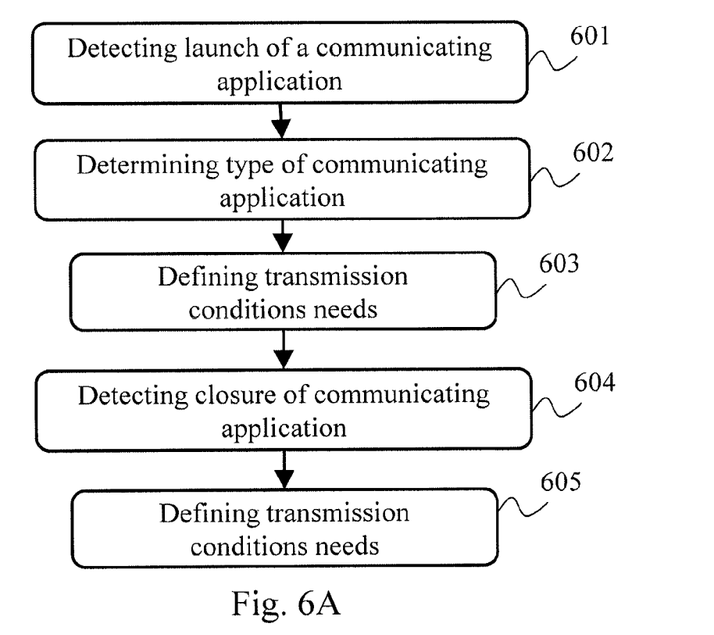
FIG. 6A schematically illustrates a first algorithm for defining transmission condition needs.

FIG. 6A schematically illustrates a first algorithm for defining transmission condition needs. This algorithm is applied particularly in the case where the communication device 110 implements applications communicating via the wireless network 120 with other applications implemented by the communication devices 111, 112.

In a step 601, the communication device 110 detects the launching of an application adapted for communicating via the wireless network 120. For example, the communication device 110 detects an internal event indicating that the application has been launched on the communication device 110, or the communication device 110 receives a message via the wireless network 120 indicating that the application has been launched on another communication device 111, 112.

In a following step 602, the communication device 110 determines a type of the application. For example, the communication device 110 determines whether the application is based on a transmission of video content in streaming mode, or a transmission of audio content in streaming mode, or on another type of transmission via the wireless network 120. The type of application may be determined by means of an application identifier, such as an application name, obtained by the communication device 110 when the application was launched.

In a following step 603, the communication device 110 defines the transmission condition needs, as used in the step 308, according to the determined type of the application. The communication device 110 then takes account of the fact that the application, of the type as determined, has been launched. For example, up until then, no video content broadcast application in streaming mode was using the services of the wireless network 120.

In a following step 604, the communication device 110 detects the closure of the application. For example, the communication device 110 detects an internal event indicating that the application has been closed on the communication device 110, or the communication device 110 receives a message via the wireless network 120 indicating that the application has been closed on another communication device 111, 112.

In a following step 605, the communication device 110 defines the transmission condition needs, as used in the step 308, according to the determined type of the application. The communication device 110 takes account of the fact that the application, of the type as determined, has been closed. For example, henceforth no application broadcasting video content in streaming mode uses the services of the wireless network 120.

Figure 6B:
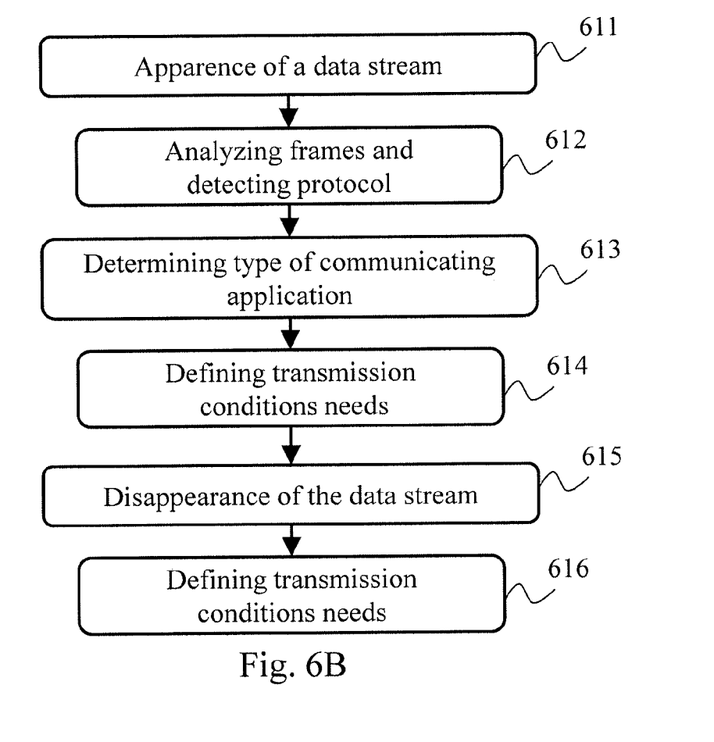
FIG. 6B schematically illustrates a second algorithm for defining transmission condition needs.

FIG. 6B schematically illustrates a second algorithm for defining transmission condition needs. This algorithm is applied particularly in the case where the communication device 110 is an access point managing the wireless network 120.

In a step 611, the communication device 110 detects an appearance of a data stream passing via the wireless network 120. For example, the communication device 110 detects an internal event indicating that such a data stream is generated, is received, or passes through the communication device 110, or the communication device 110 receives a message via the wireless network 120 indicating that such a data stream is generated, is received, or passes through another communication device 111, 112. Frames of the data stream are obtained by the communication device 110 in order to perform a protocol analysis thereof.

In a following step 612, the communication device 110 performs the protocol analysis of the frame content of the data stream and determines a communication protocol used for transmitting these frames. For example, the communication device 110 determines that the TCP (Transmission Control Protocol, as defined in the normative document RFC 793) or that the UDP (User Data Protocol, as defined in the normative document RFC 768, or that the RTP (Real-time Transport Protocol, as defined in the normative document RFC 3550) is used.

In a following step 613, the communication device 110 determines a type of application to which the data stream corresponds, according to the result of the protocol analysis. For example, in case of use of the RTP protocol, the communication device 110 is capable of distinguishing a transmission of video content in streaming mode from a transmission of audio content in streaming mode by means of the PT (Payload Type) field of the RTP header of the data stream frames. Indeed, this field corresponds to the profile of the data encapsulated according to the RTP protocol and provides an indication of the type of encoding used for shaping the transported data. Thus the communication device 110 determines whether the application is based on a transmission of video content in streaming mode or transmission of audio content in streaming mode, or on another type of transmission via the wireless network 120.

In a following step 614, the communication device 110 defines the transmission condition needs, as used in the step 308, according to the determined type of the application. The communication device 110 then takes account of the appearance of the data stream corresponding to the application the type of which was determined. For example, until then no video content broadcast stream in streaming mode was passing over the wireless network 120.

In a following step 615, the communication device 110 detects a disappearance of the data stream. For example, the communication device 110 detects an internal event indicating that the data stream is no longer generated, is no longer received, or no longer passes through the communication device 110, or the communication device 110 receives a message via the wireless network 120 indicating that the data stream is no longer generated by, is no longer received by or no longer passes through another communication device 111, 112.

In a following step 616, the communication device 110 defines the transmission condition needs, as used in the step 308, according to the determined type of the application. The communication device 110 then takes account of the disappearance of the data stream corresponding to the application the type of which was determined. For example, henceforth no video content broadcast stream in streaming mode passes over the wireless network 120.

Thus, as shown by the algorithms in FIGS. 6A and 6B, the communication device 110 can be adapted so as to dynamically modify the predetermined criterion enabling the communication device 110 to determine the transmission condition needs, meaning whether the disturbances observed on the selected communication channel correspond to satisfactory transmission conditions.

The invention claimed is:

1. A configuration device adapted for configuring a communication device intended to be connected to a wireless network comprising a number N of communication channels, with N≥2, the communication device being adapted for communicating via one communication channel at a time, the configuration device being adapted for performing a selection a channel from amongst the N communication channels, wherein said selection comprises:
   selecting a communication channel with an unknown disturbance level, when the disturbance level of at least one communication channel is unknown to the configuration device; and otherwise
   selecting the least disturbed communication channel;
   wherein the configuration device is adapted to perform a dynamic configuration of the communication device, the dynamic configuration comprises reactivating the selection in case of disturbances representing unsatisfactory transmission conditions on the selected communication channel according to a predetermined criterion; and
   wherein the configuration device is further adapted for deactivating the dynamic configuration, when said selection have been performed N times.

2. The configuration device according to claim 1, wherein deactivating the dynamic configuration is performed until an estimated duration of stability of the transmission conditions on the communication channels has expired.

3. The configuration device according to claim 1, wherein the dynamic configuration comprises analysing disturbances occurring on the selected communication channel and determining a type of said disturbances, and wherein said predetermined criterion depends on the type of said disturbances.

4. The configuration device according to claim 3, wherein the analysing disturbances comprises determining at least one type of disturbance from amongst:
   a blocking noise, which has a level higher than a first threshold;
   a persistent noise, which is present at least for a first predefined duration;
   a highly persistent noise, which is present at least for a second predefined duration greater than the first predefined duration; and
   a repetitive noise, which is a noise appearing a plurality of times during a predefined period.

5. The configuration device according to claim 4, wherein the analysing disturbances comprises:
   dividing an analysis total period into a plurality of unitary periods; and
   activating a first counter, incremented whenever the disturbance level exceeds a second threshold during a unitary period;
   and wherein it is considered that the disturbances are persistent noise when the first counter is higher than a third threshold, once the analysis total period has elapsed.

6. The configuration device according to claim 5, wherein it is considered that the disturbances are highly persistent noise when the first counter is above a fourth threshold, once the analysis total period has elapsed, said fourth threshold being higher than said third threshold.

7. The configuration device according to claim 4, wherein analysing disturbances comprises:
   dividing an analysis total period into a plurality of analysis sub-periods; and
   activating a second counter, incremented whenever a predefined disturbance type is detected during one said analysis sub-period;
   and wherein it is considered that the disturbances are repetitive noise when the second counter is higher than a fifth threshold, once the analysis total period has elapsed.

8. The configuration device according to claim 3, wherein the predetermined criterion further depends on a type of application communicating via the wireless network.

9. The configuration device according to claim 8, wherein the configuration device is further adapted for performing protocol analysis of frames passing through the communication device and for determining the type of application according to a result of the protocol analysis.

10. The configuration device according to claim 1, wherein the configuration device is adapted for suspending the dynamic configuration, after each reactivation of said selection, until an estimated period of stabilisation of the reconfiguration of communication devices in the wireless network following a change of communication channel has expired.

11. The configuration device according to claim 1, wherein the configuration device is included in the communication device.

12. The configuration device according to claim 1, wherein the communication device is a Wi-Fi access point.

13. A method implemented by a configuration device for configuring a communication device connected to a wireless network comprising a number N of communication channels, with N≥2, the communication device communicating via one communication channel at a time, the configuration device performing a selection a channel among the N communication channels, wherein the selection comprises:
   selecting a communication channel with an unknown disturbance level, when the disturbance level of at least one communication channel is unknown to the configuration device; and otherwise
   selecting the least disturbed communication channel;
   and wherein the configuration device performs a dynamic configuration of the communication device, the dynamic configuration comprising reactivating the selection in case of disturbances representing unsatisfactory transmission conditions on the selected communication channel according to a predetermined criterion;
   and wherein the method comprises deactivating the dynamic configuration, when said selection have been reactivated N times.

* * * * *